United States Patent [19]
Tanaka et al.

[11] Patent Number: 5,210,670
[45] Date of Patent: May 11, 1993

[54] REEL BRAKE OPERABLE FROM BOTH SIDES OF MAGNETIC TAPE CASSETTE

[75] Inventors: Masato Tanaka; Kiyotaka Yanaka, both of Tokyo, Japan

[73] Assignee: Sony Corporation, Japan

[21] Appl. No.: 622,649

[22] Filed: Dec. 5, 1990

[30] Foreign Application Priority Data

Dec. 6, 1989 [JP] Japan .................. 1-317026

[51] Int. Cl.$^5$ .......................... G11B 23/02; G03B 1/04
[52] U.S. Cl. .................................. 360/132; 242/198; 242/199
[58] Field of Search .................. 360/132; 242/198, 199

[56] References Cited

U.S. PATENT DOCUMENTS

| 4,022,402 | 5/1977  | Morimoto ............... | 360/132 |
|-----------|---------|-------------------------|---------|
| 4,235,395 | 11/1980 | Wardenaar et al. ....... | 360/132 |
| 4,302,787 | 11/1981 | Itani ................... | 360/132 |
| 4,513,928 | 4/1985  | Hackett ................. | 360/132 |
| 4,553,717 | 11/1985 | Takagi .................. | 360/132 |
| 4,579,295 | 4/1986  | Harada .................. | 360/132 |
| 4,607,307 | 8/1986  | Sieben .................. | 360/132 |
| 4,638,393 | 1/1987  | Oishi et al. ............ | 360/132 |
| 4,886,220 | 12/1989 | Oishi ................... | 360/132 |
| 4,918,558 | 4/1990  | Igarashi et al. ......... | 360/132 |
| 5,056,735 | 10/1991 | Gelardi et al. .......... | 360/132 |

Primary Examiner—Stuart S. Levy
Assistant Examiner—Jefferson Evans
Attorney, Agent, or Firm—Lewis H. Eslinger; Jay H. Maioli

[57] ABSTRACT

A magnetic tape cassette incorporates therein a braking member which brakes reel hubs when the magnetic tape cassette is not in use, so that the reel hubs are prevented from being rotated. The braking member can be operated to release the reel hubs from their locked conditions from any side of the upper and lower parts of the cassette casing. Thus, the magnetic tape cassette of this invention can correspond with a tape cassette of the double-sided use kind, in which a cassette casing is turned over and the recording and reproduction can be performed in a cited fashion.

2 Claims, 7 Drawing Sheets

REEL BRAKE OPERABLE FROM BOTH SIDES OF MAGNETIC TAPE CASSETTE

BACKGROUND OF THE INVENTION

1. Field of the Invention

The present invention relates generally to magnetic tape cassettes and, more particularly, to a magnetic tape cassette having a braking member which locks a reel hub so that the reel hub can be inhibited from being rotated uselessly when the magnetic tape cassette is not in use.

2. Description of the Prior Art

Conventionally, in a magnetic tape cassette for accommodating therein a magnetic tape on which a signal such as a video signal, a PCM (pulse code modulated) signal or the like is recorded at high density, various magnetic tape cassettes are now available on the market. Each of these magnetic tape cassettes incorporates therein a braking member to lock the reel hub so that the reel hub is inhibited from being rotated uselessly in order to prevent the magnetic tape from slackening when the magnetic tape cassette is not in use. These conventional magnetic tape cassettes might be, for example, a ½-inch video tape cassette, an 8 mm video tape cassette or the like.

More specifically, when this magnetic tape cassette is not in use, this braking member is biased by the spring-biasing force of a spring in a direction so that it is urged against the reel hub, thereby locking the reel hub so that the reel hub cannot be rotated. When the magnetic tape cassette is in use, the braking member is moved to the direction in which it is isolated from the reel hub by a lock releasing pin inserted thereto from the outside of the cassette casing. Thus, the locking of the reel hub is released.

The magnetic tape cassette having such braking member is of the type of a so-called one side use so that only one side of the magnetic tape can be recorded and reproduced, that is, the tape cassette cannot be turned over in use. For this reason, the braking member is adapted to perform the lock releasing operation only from one of the upper and lower parts of the cassette casing. For example, when the magnetic tape cassette is loaded onto a cassette tape recorder, the lock releasing pin is inserted into the magnetic tape cassette from its lower part side and the hub lock releasing operation of the braking member is performed by this lock releasing pin.

However, in a magnetic tape cassette in which a PCM signal is recorded on a magnetic tape at high recording density, a novel tape cassette of a double-sided use type has been developed recently, in which the two sides of the magnetic tape can be recorded and reproduced. In that case, since the cassette casing is turned over to use the two sides of the magnetic tape, the hub lock releasing operation of the braking member cannot be performed by the conventional braking member which performs the hub lock releasing operation only from the one side of the cassette casing.

Therefore, a magnetic tape cassette is required in which the braking member can be operated from two sides of the cassette casing. All of the existing magnetic tape cassettes are of the above-mentioned type so that the braking member can be operated only from the one side of the cassette casing. Thus, a magnetic tape cassette in which the hub lock releasing operation can be performed from the two sides of the cassette casing is not yet proposed.

OBJECTS AND SUMMARY OF THE INVENTION

Accordingly, it is an object of the present invention to provide an improved magnetic tape cassette which can eliminate the aforenoted shortcomings and disadvantages encountered with the prior art.

More specifically, it is an object of the present invention to provide a magnetic tape cassette in which a hub lock releasing operation of a braking member can be performed from any one of upper and lower parts of a cassette casing.

It is another object of the present invention to provide a magnetic tape cassette which can be applied to a magnetic tape cassette of a double-sided type in which a cassette casing is turned over and the recording and reproduction can be performed in a reciprocating fashion.

It is still another object of the present invention to provide a magnetic tape cassette in which a space of a cassette casing can be saved from a design standpoint.

It is a further object of the present invention to provide a magnetic tape cassette which can reduce the number of parts of a cassette tape recorder and also can simplify the mechanism of the cassette tape recorder.

It is yet a further object of the present invention to provide a magnetic tape cassette in which a hub lock releasing operation can be performed positively.

It is still a further object of the present invention to provide a magnetic tape cassette in which a magnetic tape can be transported stably.

It is still a further object of the present invention to provide a magnetic tape cassette which is high in reliability.

As an aspect of the present invention, a magnetic tape cassette is comprised of a braking member provided within a cassette casing so that the braking member is brought in contact with or is isolated from peripheral surfaces of a pair of reel hubs around which a magnetic tape is wrapped and the braking member is always spring-biased in the locking direction in which the braking member is urged against the reel hubs, wherein symmetrical inclined cam surfaces are formed on the upper and lower sides of the braking member and a hub lock releasing operation of the braking member is performed by pressing the inclined cam surfaces by a pin inserted from any one of insertion apertures formed on the upper and lower parts of the cassette casing.

The above, and other objects, features and advantages of the present invention will be apparent in the following detailed description of an illustrative embodiment when read in conjunction with the accompanying drawings, in which like reference numerals are used to identify the same or similar parts in the several views.

DETAILED DESCRIPTION OF THE PREFERRED EMBODIMENT

An embodiment of the magnetic tape cassette according to the present invention will now be described with reference to FIGS. 1 to 6. The magnetic tape cassette of this embodiment is constructed as an extremely small magnetic tape cassette.

Figure 4:
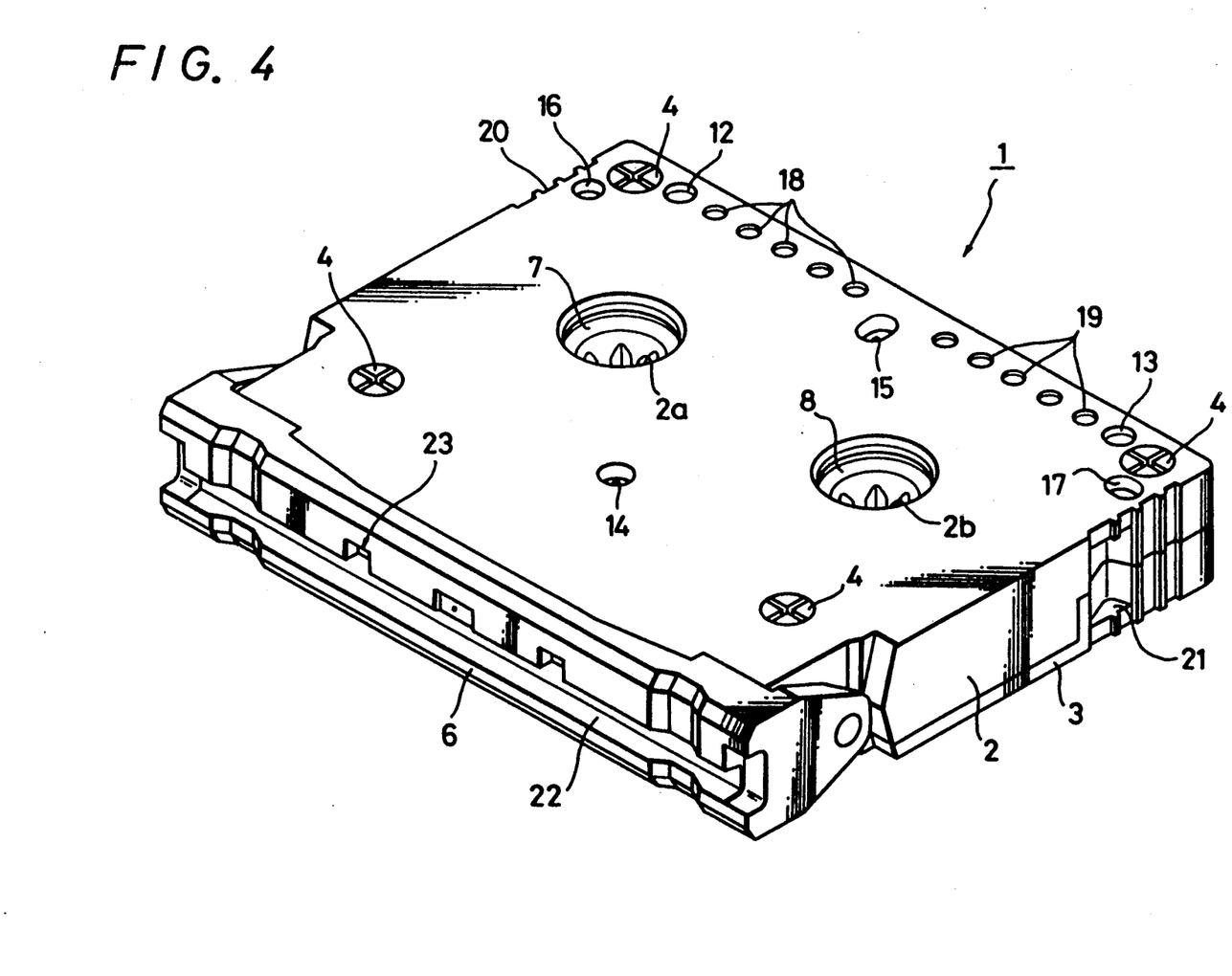
FIG. 4 is a perspective view of an embodiment of the magnetic tape cassette according to the present invention.
Figure 5:
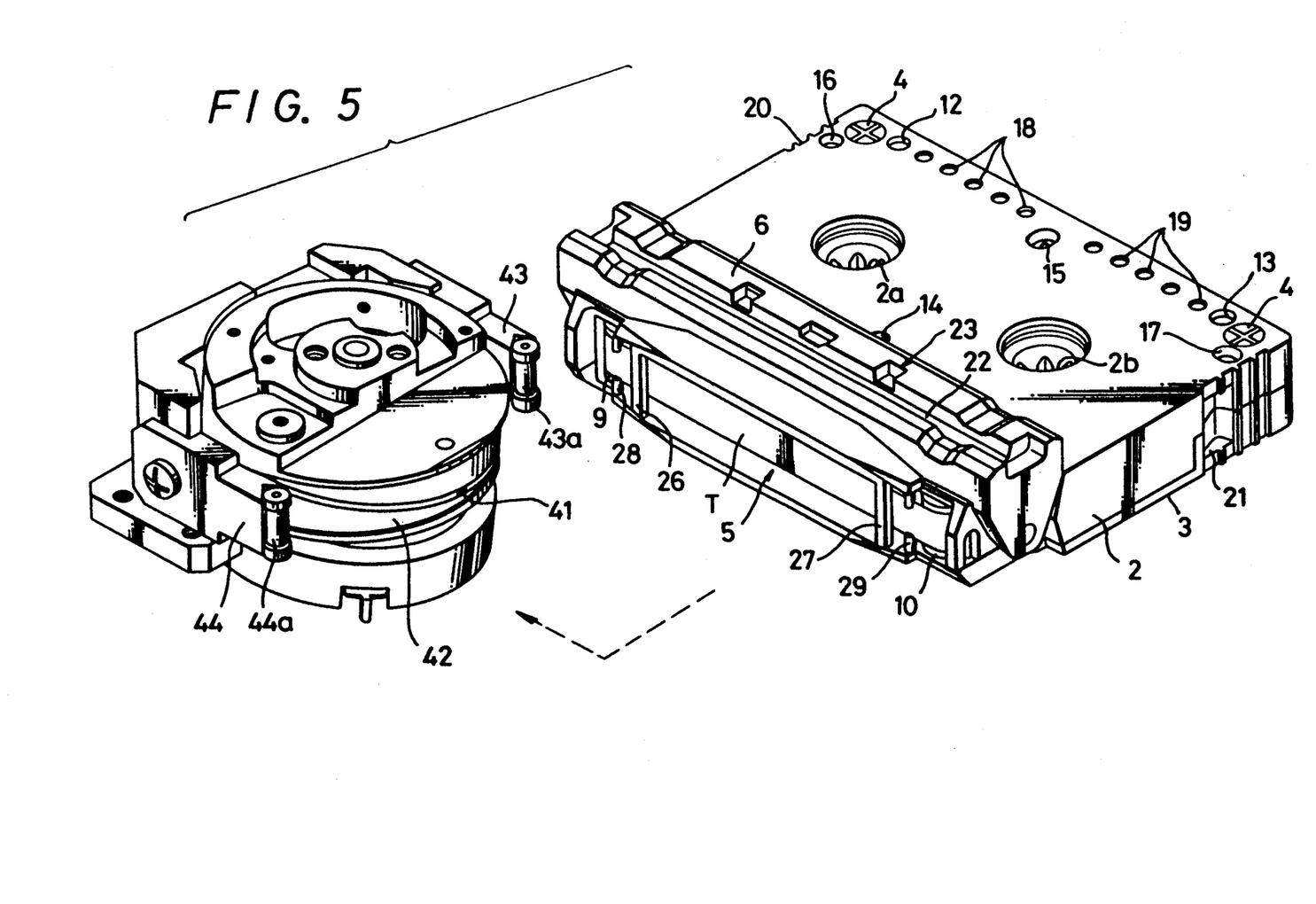
FIG. 5 is a perspective view illustrating a relationship between the magnetic tape cassette and a head drum.
Figure 6:
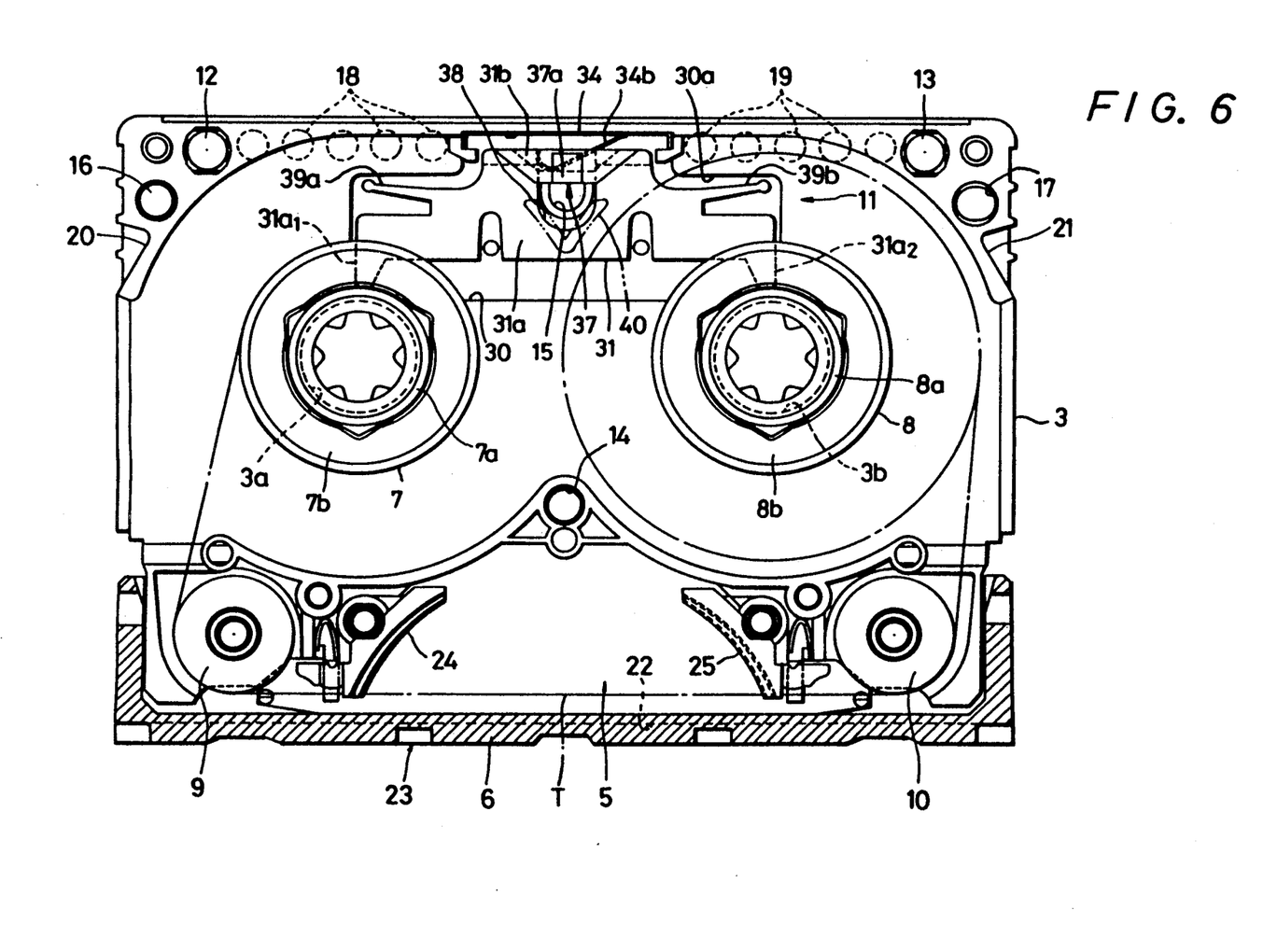
FIG. 6 is a plan view illustrating the magnetic tape cassette of the present invention from the lower half side.

In FIGS. 4 to 6, reference numeral 1 generally designates a a cassette casing which accommodates therein a magnetic tape on and from which, for example, a PCM signal is recorded and reproduced. This cassette casing 1 is formed by fastening an upper half or upper part 2 and a lower half or lower part 3 by screws 4, and a lid 6 is rotatably supported to the cassette casing so as to open and close an opening portion 5 formed on the front surface sides of both the upper and lower parts 2 and 3.

A magnetic tape T is accommodated within the cassette casing 1, i.e. between the upper and lower parts 2 and 3 under the condition such that the magnetic tape T is wound around a pair of reel hubs 7 and 8 provided in correspondence with hub drive shaft insertion apertures 2a, 2b and 3a, 3b. One portion of the magnetic tape T is exposed to the front surface side opening portion 5 under the condition such that the magnetic tape T is extended between pinch rollers 9 and 10 serving as guide rollers rotationally supported at both sides of the opening portion 5.

A braking mechanism 11 is provided within the cassette casing 1 to brake the two reel hubs 7 and 8 when this magnetic tape cassette is not in use. Mis-erase preventing mechanisms 12 and 13 are provided at the upper and lower surface sides of the cassette casing 1 at its two rear corner portions so as to communicate with the upper and lower parts 2 and 3. Positioning reference apertures 14, 15 and 16, 17 are formed through the cassette casing 1 at its central front and back portions in the front to back direction and at its two rear side portions in the lateral direction. A plurality of predetermined detection apertures 18 and 19 are formed through the cassette casing at its rear edge portion in the lateral direction. Further, grip portions 20 and 21 are formed on the rear portions of two side walls of the cassette casing 1.

An engaging portion 23 for a cassette changer is formed along a guide groove 22 extending along the width direction of the lid 6 which opens and closes the front surface side opening portion 5 of the cassette casing 1.

In the magnetic tape cassette thus arranged, the magnetic tape T accommodated within the cassette casing 1 is recorded and/or reproduced by a rotary head in a helical scan fashion.

More specifically, as shown in FIG. 5, a rotary head 41 is rotated at a predetermined slant angle relative to a head drum 42, and the head drum 42 is partly inserted into the front surface side opening portion 5 which is opened by rotating the lid 6 of the cassette casing 1 in the upper or lower direction. The magnetic tape T extended across the opening portion 5 is slidably moved so as to be wound around the insertion side peripheral surface of the head drum 42. Thus, when the rotary head 41 is rotated, slant tracks across the magnetic tape T are formed on the magnetic tape T.

In this embodiment, in order to ensure that the magnetic tape T is brought in slidable contact with the head drum 42 in a helical scan fashion, as shown in FIG. 6, a pair of tape guide members 24 and 25 whose guide portions are inclined in the opposite direction are disposed in the insertion portion of the opening portion 5 of the cassette casing 1 for the head drum 42 at their positions inside the guide rollers 9 and 10 such that the tape guide members 24 and 25 can be vibrated and moved in the lateral direction in an opposing fashion. When the head drum 42 is inserted into the opening portion 5, the tape guide members 24 and 25 come in contact with the peripheral surface of the head drum 42, and guide the magnetic tape T under the condition such that the magnetic tape T is sandwiched between them and the peripheral surface of the head drum 42.

Further, as shown in FIG. 5, the head drum 42 has at its both side portions formed wing guides 43 and 44 which are inserted between the pinch rollers 9, 10 and the tape guide members 24, 25 in both side portions of the opening portion 5 of the cassette casing 1. Rollers 43a and 44a are mounted on the front end portions of the two wing guides 43 and 44, and brought in slidable contact with the magnetic tape T, urging the magnetic tape T against the tape guide members 24 and 25.

The wing guides 43 and 44 are inserted into the opening portion 5 of the cassette casing 1 such that they are located between supporting members 26 and 27 provided near the inside of the opening portion 5 and tape projection preventing guide protrusions 28, 29 positioned between the supporting members 26 and 27 and the pinch rollers 9 and 10.

The arrangement of the braking mechanism 11 in the thus arranged magnetic tape cassette will be explained with reference to FIGS. 1 to 3A and 3B.

As illustrated, a recess portion 30 of substantially rectangular configuration is formed on the bottom surface of the lower part 3 at its rear central portion. A braking member 31 is accommodated within this recess portion 30 such that the braking member 31 can be freely moved in the front to back direction, that is, in the direction in which the braking member 31 approaches or moves away from the reel hubs 7 and 8.

Figure 2:
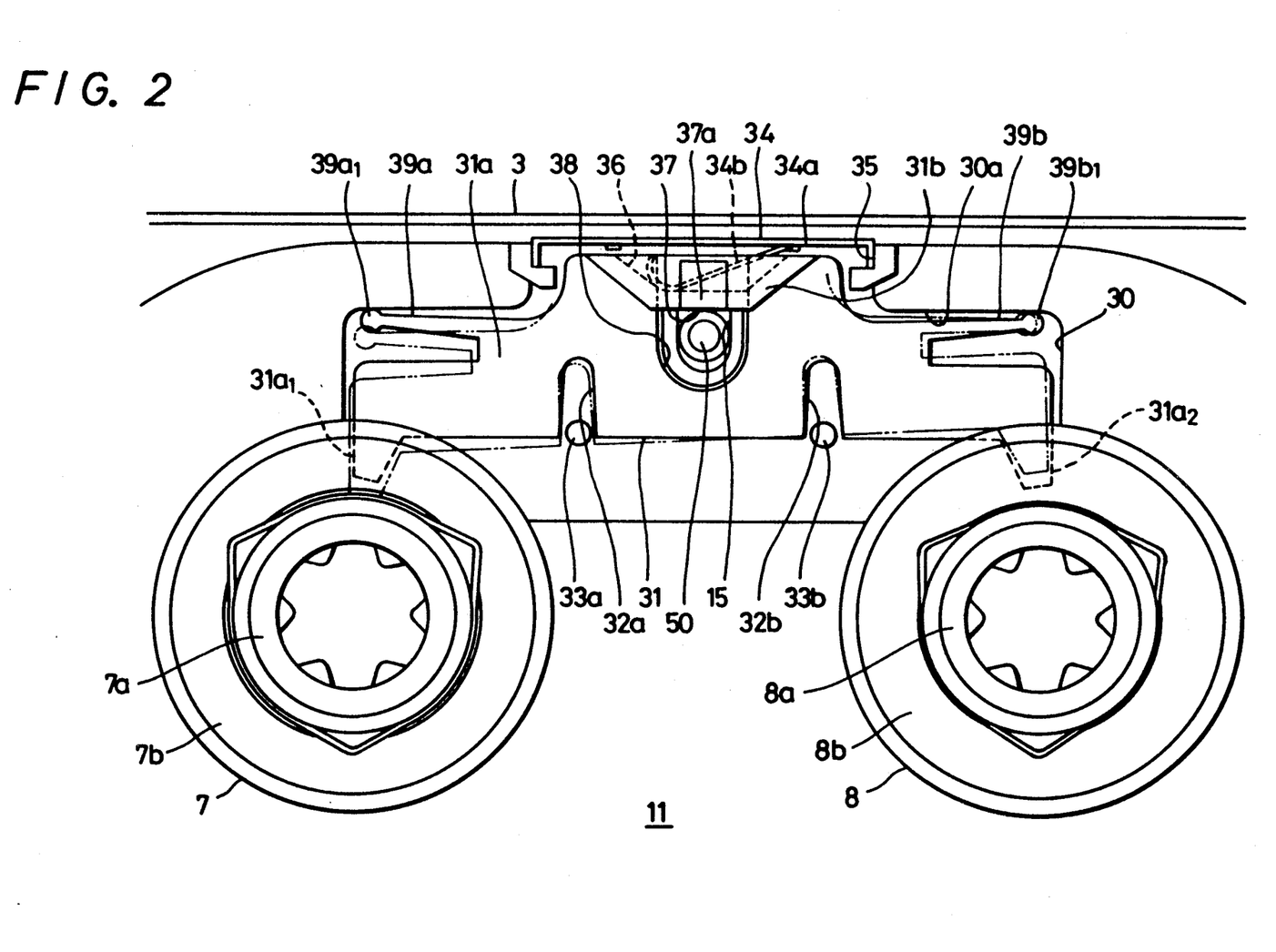
FIG. 2 is a plan view of the braking mechanism portion and illustrating the hub lock released condition.

As shown in the figures, this braking member 31 is composed of a flat plate portion 31a which is flush with the bottom surface of the recess portion 30 and a vertically-protruded wall portion 31b erected from the rear portion of the flat plate portion 31a. A pair of protruded nail members 31a1 and 31a2 are protruded from the front portion of the flat plate portion 31a so as to correspond with the two reel hubs 7 and 8 as shown in FIG. 2. The top portions of the protruded nail members 31a1 and 31a2 are urged against the reel hubs 7 and 8, thereby the two reel hubs 7 and 8 being locked, as will be described later.

Figure 1:
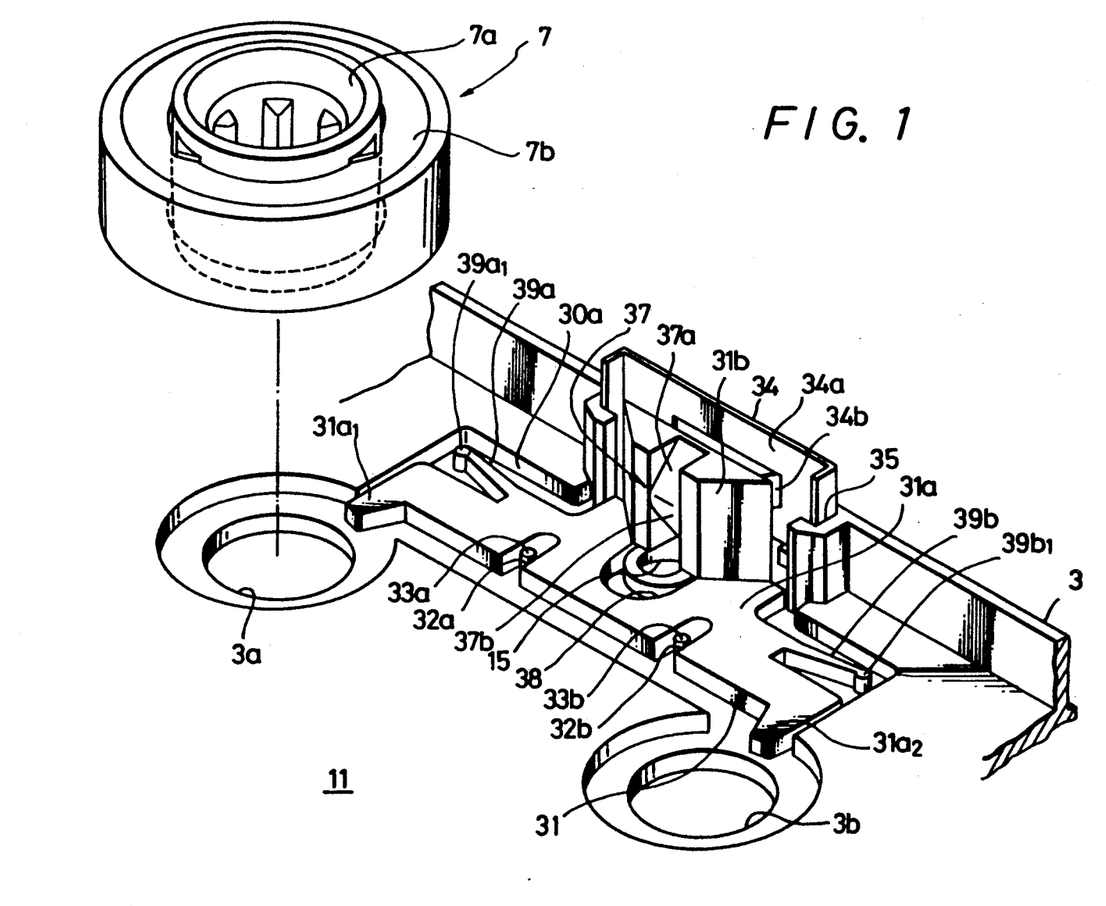
FIG. 1 is a perspective view of a braking mechanism portion of a magnetic tape cassette to which the present invention is applied.

The reel hubs 7 and 8 are comprised of inner hubs 7a and 8a with which hub drive shafts are engaged and outer hubs 7b and 8b which can be moved in the axial directions relative to the inner hubs 7a and 8a and which can be engaged with the inner hubs 7a and 8a in the circumferential direction thereof. The protruded nail members 31a1 and 31a2 of the braking member 31 are urged against the peripheral surfaces of the inner hubs 7a and 8a protruded from the lower surfaces of the outer hubs 7b and 8b, respectively.

A pair of left and right guide slits 32a and 32b of recess configurations are formed on the central portion of the flat plate portion 31a so as to extend from the front edge of the flat plate portion 31a to its rear direction. A pair of guide pins 33a and 33b are projected from the bottom surface of the recess portion 30 in correspondence with the pair of guide slits 32a and 32b. The guide slits 32a and 32b are guided by the guide pins 33a and 33b, whereby the moving direction of the braking member 31 is restricted.

A plate spring 34 is provided at the rear side of the braking member 31 to spring-bias the braking member 31. This plate spring 34 is composed of a main plate portion 34a and an arm portion 34b erected from the central portion of the main plate portion 34a. The main plate portion 34a is engaged with a spring accommodating portion 35 provided at the rear side wall inner surface side of the lower part 3, and the arm portion 34b is engaged at its top portion with a concave portion 36 formed on the rear surface side of the vertically-projected portion 31b as shown in FIG. 2. Thus, the braking member 31 is always spring-biased in the forward direction, i.e. in the direction in which the protruded nail members 31a1 and 31a2 are urged against the peripheral surfaces of the inner hubs 7a and 7b.

The vertically-protruded wall portion 31b of the braking member 31 has on its central front surface side formed a pressing operation portion 37 which allows the braking member 31 to perform the hub lock releasing operation. This pressing operation portion 37 is formed as a mountain-configuration whose central portion is high in cross-sectional side view, that is, this pressing operation portion 37 has inclined cam surfaces 37a and 37b whose cam surfaces are symmetrically inclined rearwardly toward the upper to lower sides from the central portion. When this pressing operation portion 37 is pressed by the lock releasing pin inserted from the insertion aperture bored through the two upper and lower parts 2 and 3, the braking member 31 is moved in the rear direction, thereby the reel hubs being released from their locked conditions.

In this embodiment, one of the positioning reference apertures of the cassette casing 1, i.e. the reference aperture 15 at the rear and central portion of the cassette casing 1 in its front to back direction so that, when this magnetic tape cassette is loaded onto the cassette tape recorder, a cassette tape recorder side positioning pin 50 inserted into the reference aperture 15 is used as the lock releasing pin, so that the hub lock releasing operation of this braking member 31 is performed by this positioning pin 50.

An opening 38 elongated in the front to back direction is formed through the central portion of the flat plate portion 31a of the braking member 31 in correspondence with the reference aperture (insertion aperture) 15, and this opening 38 permits locking member 31 to slide when the positioning pin (lock releasing pin) 50 is inserted from the lower half 3 side.

A pair of left and right protruded portions 39a and 39b are symmetrically protruded from both sides of the flat plate portion 31a of the braking member 31 at its rear portion in the lateral direction. The protruded portions 39a and 39b are made to have a predetermined resiliency so that, if the braking member 31 is abnormally skewed in the hub lock releasing operation, any one of top circular-shaped portions 39a1 and 39b1 of the two protruded portions 39a and 39b comes in contact with a rear side edge surface 30a of the recess portion 30, thus the braking member 31 is returned to the normal hub lock releasing condition, as will be described later.

Figure 3A:
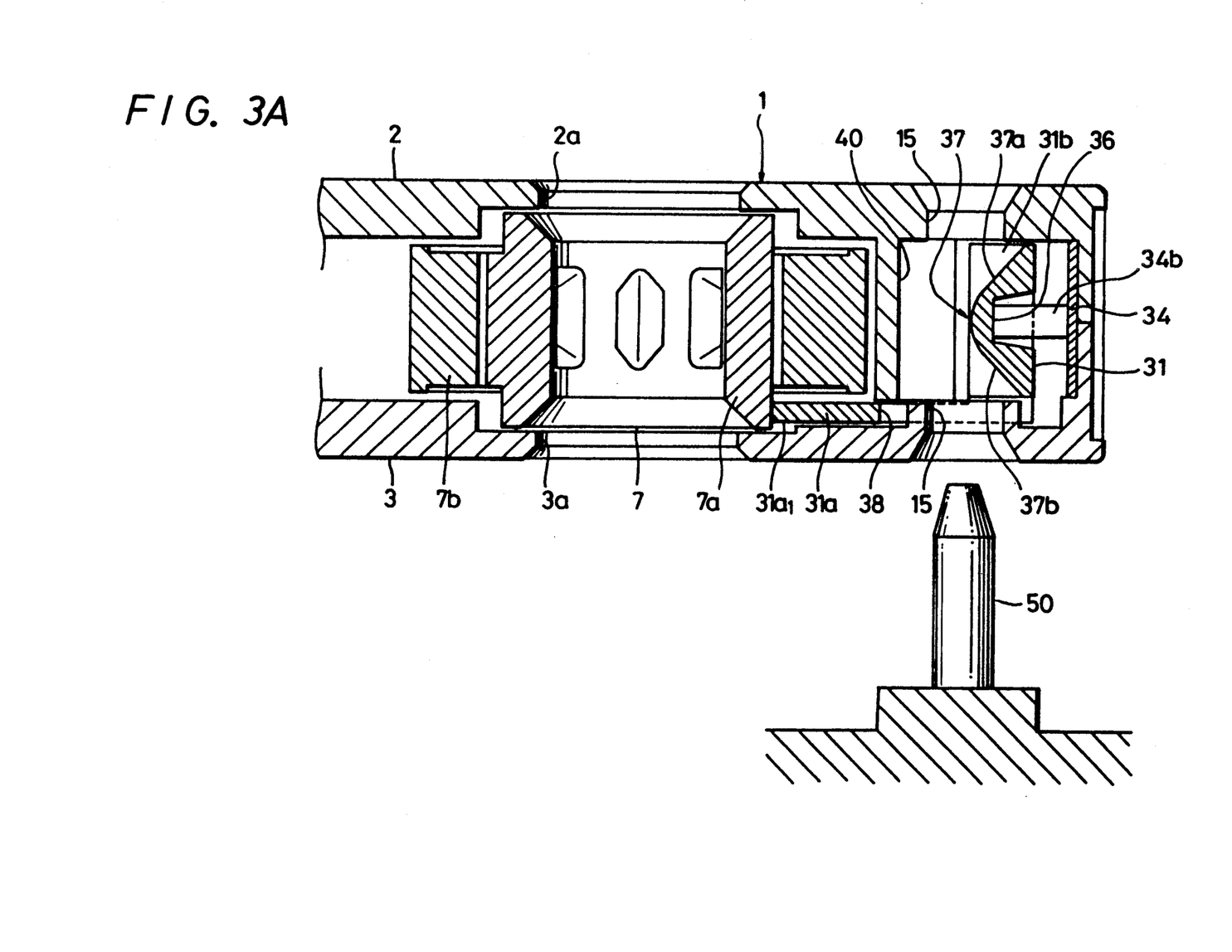
FIGS. 3A and 3B are longitudinal cross-sectional side views to which references will be made in explaining the operation of the braking mechanism portion, respectively.

In this braking mechanism 11, as shown in FIG. 3A, a supporting column member 40 projects from the inner surface side of the upper part 2 downwardly and the lower end face of the support column member 40 is facing to the central portion of the flat plate portion 31a of the braking member 31. The braking member 31 is restricted by this support column member 40 so that it is prevented from being disengaged from the recess 30.

As will be clear from the above-mentioned arrangement, according to the braking mechanism 11 of the magnetic tape cassette of this embodiment, in the normal condition, or when the magnetic tape cassette is not in use, the protruded nail members 31a1 and 31a2 of the braking member 31 are urged against the peripheral surfaces of the inner hubs 7a and 8a of the two reel hubs 7 and 8 by the spring-biasing force of the plate spring 34, whereby the two reel hubs 7 and 8 are located and hence they can be prevented from being rotated by a certain amount of shock (see FIGS. 3A and 6).

When the magnetic tape cassette is loaded onto the cassette tape recorder, the cassette tape recorder side positioning pin 50 is inserted into the reference aperture 15 (in actual practice, the cassette casing 1 is lowered and the reference aperture 15 is engaged with the positioning pin 50), the positioning of the cassette casing 1 is performed and the hub lock releasing operation by the braking member 31 is simultaneously performed.

Figure 3B:
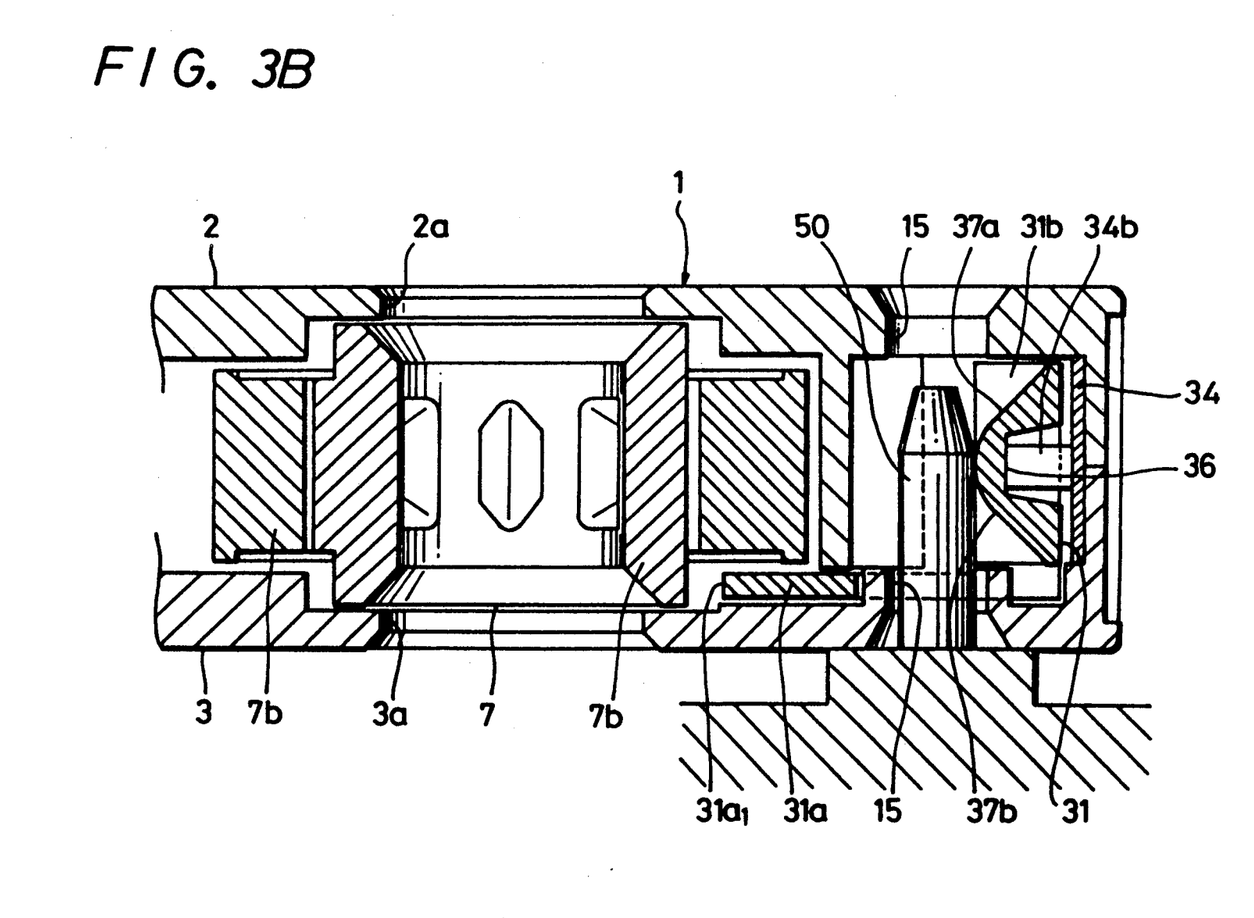

The hub lock releasing operation by the braking member 31 can be performed from any side of the upper part 2 and the lower part 3. That is, when the magnetic tape cassette is loaded onto the cassette tape recorder under the condition such that the upper part 2 side (so-called side A) thereof is oriented above as shown in FIG. 3, the positioning pin 50 inserted into the reference aperture 15 of the lower part 3 side presses the inclined cam surface 37b (lower side in FIG. 3) of the pressing operation portion 37 so that the braking member 31 is moved rearwards against the spring-biasing force of the plate spring 34, that is, the braking member 31 is moved in the direction in which the protruded nail members 31a1 and 31a2 come away from the inner hubs 7a and 8a of the reel hubs 7 and 8 (see FIGS. 3B and 2). Conversely, when the magnetic tape cassette is loaded onto the cassette tape recorder under the condition such that the cassette casing 1 is turned over and the lower part 3 side is oriented above, the positioning pin 50 inserted into the reference aperture 15 of the upper part 2 side presses the inclined surface 37a of the other side of the pressing operation portion 37, whereby the the braking member 31 is moved in the rear direction similarly as described above, thus the reel hubs 7 and 8 being released from their locked conditions the reel hubs 7 and 8 being allowed to rotate freely.

In the hub lock releasing operation of the braking member 31, the braking member 31 is operated by pressing one point of the central portion of the braking member 31. There is then the substantial risk that the braking member 31 is frequently operated in an unbalanced fashion and is moved in the inclined condition as shown by a two-dot chain line in FIG. 2, thus the braking member 31 being placed in a so-called deviated skewed condition where only one protruded nail member is brought in contact with the reel hub and does not come apart from the reel hub. In that case, according to the magnetic tape cassette of this embodiment, the circular-shaped portion of any one of the left and right protruded portions (the circular-shaped portion 39b1 of the right protruded portion 39b in the example of FIG. 2) comes in contact with the rear side edge surface 30a of the recess 30, whereby the braking member 31 is returned to the normal condition that the two protruded nail members 31a1 and 31a2 correspond with the reel hubs 7 and 8 in a well-balanced condition by virtue of cushion-action of the protruded portion. Thus, the two protruded nail members 31a1 and 31a2 come away from the reel hubs 7 and 8 together, so that the braking member 31 can be protected from the above-mentioned defect and the two reel hubs 7 and 8 can be released from their locked conditions.

Under the condition that the reel hubs 7 and 8 are positively released from being locked by the braking member 31, the reel hubs 7 and 8 are rotated by the hub drive shafts (not shown) of the cassette tape recorder, whereby the magnetic tape T being transported.

As described above, according to the magnetic tape cassette of this embodiment, the hub lock releasing operation by the braking member can be performed from either the upper part 2 side or the lower part 3 side of the cassette casing 1. Therefore, the magnetic tape cassette of this invention can be applied to a double-sided use cassette where the cassette casing 1 is turned over and the recording and reproduction can be performed in a two-sided fashion.

Since the positioning reference aperture 15 of the cassette casing 1 is utilized as the pin insertion aperture into which the pin 50 for operating the braking member 31 is inserted, insertion apertures need not be bored respectively through the upper and lower parts 2 and 3 of the cassette casing 1, which saves the space of the cassette casing 1 from a design standpoint. This is very effective for the extremely small magnetic tape cassette of this embodiment in which the space of the cassette casing 1 is restricted. Also, in the cassette tape recorder side, special lock releasing pin for operating the braking member 31 is not needed and the positioning of the cassette casing 1 and the hub lock releasing operation of the braking member 50 are simultaneously performed by the positioning pin 50 which performs the positioning of the cassette casing 1. Therefore, the assembly parts on the cassette tape recorder side can be reduced and the mechanism of the cassette tape recorder can be simplified.

Further, if the braking member 31 is abnormally operated in the skewed condition during the hub lock releasing operation, the braking member 31 can be returned to the normal condition by the cushion action of any one of the left and right protruded portions 39a and 39b, thereby ensuring that the hub lock releasing operation is always performed positively. Therefore, in the recording or reproducing operation, the reel hubs 7 and 8 can be smoothly rotated without any resistance to ensure that the magnetic tape T can be stably transported. Thus, the magnetic tape cassette of the present invention can bring about various advantages unlike the prior art.

While the present invention is applied to the extremely small magnetic tape cassette for recording a PCM signal in the above-mentioned embodiment, the present invention is not limited thereto and can be applied to a wide variety of tape cassettes such as a standard audio compact tape cassette and other tape cassette of the double-sided type.

As set forth above, according to the present invention, it is possible to provide a novel magnetic tape cassette in which the hub lock releasing operation by the braking member can be performed from any one of the upper and lower parts of the cassette casing. Therefore, the magnetic tape cassette of the present invention can be applied to a magnetic tape cassette of the double-sided type in which the cassette casing is turned over and the recording and reproducing operations can be effected in a two-sided fashion.

Since the insertion aperture into which the pin is inserted also serves as the positioning reference aperture of the cassette casing, the space of the cassette casing can be saved and this can achieve a remarkable effect in the extremely small magnetic tape cassette in which the space of the cassette casing is restricted.

Furthermore, since the pair of protruded portions are provided at the left and right portions of the braking member to thereby avoid the defect that only one reel is released, the braking member can always be operated accurately to thereby positively release the reel hubs from being locked. Accordingly, it is possible to provide a magnetic tape cassette of high reliability.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. A magnetic tape cassette comprising:
 a cassette casing having upper and lower parts, each part having a respective insertion aperture formed therein, the insertion apertures being in mutual axial alignment; and
 braking means provided within said cassette casing in such a manner that said braking means can be brought in contact with or come away from peripheral surfaces of a pair of real hubs arranged in said casing and around which a magnetic tape is wrapped and said braking means is spring-biased in a locking direction in which first and second front protruding members integrally formed with and rigidly extending from said braking means are respectively urged against said reel hubs, and said braking means having integrally formed therewith inclined cam surfaces on upper and lower sides relative to said upper and lower parts of the cassette casing and said inclined cam surfaces being aligned with said insertion apertures, so as to be pushed by a pin inserted through any one of said insertion apertures formed through said upper and lower parts of said cassette casing, whereby a hub lock releasing operation by said braking means is performed and wherein said braking means is provided with a pair of integrally formed, oppositely arranged rear protruded portions extending substantially perpendicular from a direction in which said first and second front protruding members extend, so that when the braking means is moved in a skewed fashion in the hub lock releasing operation one of the pair of rear protruded portions is brought in contact with a portion of said lower part of said cassette casing and the braking means is returned to an unskewed position in the hub lock releasing operation.

2. A magnetic tape cassette according to claim 1, wherein each of said insertion apertures formed in said upper and lower parts also serves as a positioning reference aperture of said cassette casing.

* * * * *

UNITED STATES PATENT AND TRADEMARK OFFICE
CERTIFICATE OF CORRECTION

PATENT NO. : 5,210,670
DATED : May 11, 1993
INVENTOR(S) : Masato Tanaka, Kiyotaka Yanaka It is certified that error appears in the above-indentified patent and that said Letters Patent is hereby corrected as shown below:

```
Column 1, line 28, after "is" insert --spring--.
          same line, delete "spring".
          line 29, delete "biasing".
Column 6, line 10, delete "to"
          line 57, after "conditions" insert --and--.
          line 66, after "deviated" insert --or--.
Column 8, line 39, change "real" to --reel--.
```

Signed and Sealed this

Twelfth Day of July, 1994

Attest:

BRUCE LEHMAN

Attesting Officer

Commissioner of Patents and Trademarks